(12) United States Patent
Kusic

(10) Patent No.: US 6,644,587 B2
(45) Date of Patent: Nov. 11, 2003

(54) SPIRALLING MISSILE—A (76) Inventor: Tom Kusic, GPO Box 932, Melbourne Vic (AU), 3001

( * ) Notice: Subject to any disclaimer, the term of this patent is extended or adjusted under 35 U.S.C. 154(b) by 16 days.

(21) Appl. No.: 10/067,963

(22) Filed: Feb. 8, 2002

(65) Prior Publication Data

US 2002/0109041 A1 Aug. 15, 2002

(30) Foreign Application Priority Data

Feb. 9, 2001 (AU) .............................................. PR3035

(51) Int. Cl.[7] .............................................. F42B 10/00
(52) U.S. Cl. ..................................... 244/3.24; 244/3.29
(58) Field of Search .............................. 244/138 R, 3.1, 244/3.23–3.3; 102/388, 386

(56) References Cited

U.S. PATENT DOCUMENTS

| 1,096,907 | A | * | 5/1914 | Gulick ..................... 244/3.23 |
| 1,181,203 | A | * | 5/1916 | Alard ........................ 244/3.21 |
| 2,393,604 | A | * | 1/1946 | Berger ........................ 102/385 |
| 3,603,533 | A | * | 9/1971 | Stripling .................... 244/3.23 |
| 4,162,053 | A | * | 7/1979 | Bjornson .................... 244/3.27 |
| 4,356,770 | A | * | 11/1982 | Atanasoff et al. ............ 102/384 |
| 4,564,340 | A | * | 1/1986 | Stahlkopf .................... 417/388 |
| 4,583,703 | A | * | 4/1986 | Kline ........................ 244/3.24 |
| 4,796,835 | A | * | 1/1989 | Galvin ....................... 244/3.29 |
| 4,886,222 | A | * | 12/1989 | Burke ......................... 244/1 R |
| 4,903,917 | A | * | 2/1990 | Peller et al. ............... 244/3.21 |
| 4,964,593 | A | * | 10/1990 | Kranz ........................ 244/3.24 |
| 5,048,772 | A | * | 9/1991 | Wisshaupt ................... 244/3.23 |
| 5,060,574 | A | * | 10/1991 | Glish et al. ................. 102/489 |
| 5,088,414 | A | * | 2/1992 | Vesa .......................... 102/388 |
| 5,155,294 | A | * | 10/1992 | Vesa .......................... 102/384 |
| 5,271,579 | A | * | 12/1993 | De Luca ..................... 244/3.24 |
| 5,277,116 | A | * | 1/1994 | Axinger et al. .............. 102/388 |
| 5,282,422 | A | * | 2/1994 | Borgstrom et al. .......... 102/384 |
| 5,322,243 | A | * | 6/1994 | Stoy ........................... 244/45 A |
| 5,326,049 | A | * | 7/1994 | Rom et al. ................... 244/3.28 |
| 5,464,173 | A | * | 11/1995 | Sharrow et al. .............. 244/3.3 |
| 5,537,928 | A | * | 7/1996 | Schneider .................... 102/293 |
| 5,975,461 | A | * | 11/1999 | Ullrich ....................... 244/3.21 |
| 6,345,785 | B1 | * | 2/2002 | Harkins et al. .............. 244/3.23 |
| 6,402,087 | B1 | * | 6/2002 | Farina et al. ................ 244/3.21 |
| 2001/0039898 | A1 | * | 11/2001 | Bar et al. .................... 102/501 |
| 2001/0054668 | A1 | * | 12/2001 | Kusic ......................... 244/34 R |
| 2002/0109040 | A1 | * | 8/2002 | Kusic ......................... 244/3.23 |
| 2002/0195521 | A1 | * | 12/2002 | Kusic ......................... 244/75 R |

FOREIGN PATENT DOCUMENTS

| DE | 2148319 | * | 9/1971 | ................. 102/388 |
| IT | 588899 | | 2/1959 | |
| JP | 94/6-26799 | | 2/1994 | |

OTHER PUBLICATIONS

U.S. patent application Ser. No. 09/886,639, Kusic, filed Dec. 27, 2001.

* cited by examiner

Primary Examiner—Charles T. Jordan
Assistant Examiner—Stephen A Holzen (57) ABSTRACT A missile 1 with a missile attachment 2 according to this invention. The missile attachment 2 consists of a tube 3 with a protruding section 4. The protruding section 4 has a concave forward facing surface area 5. The concave curvature is such that it is noticeable when the protruding section 4 is at the highest position on the tube 3. The tube is in the form of a cylindrical tube and is fitted to the missile 1 so that it encircles part of the missile and such that it can rotate continuously relative to the missile 1 during flight of the missile.

27 Claims, 8 Drawing Sheets

SPIRALLING MISSILE— A

FIELD OF THE INVENTION

The present invention relates to a missile with an attachment for inducing the missile to travel in a spiralling motion. The attachment that enables the spiralling motion to occur comprises a tube that encircles part of the missile and is able to rotate around the encircled part of the missile, with a protruding section protruding from the tube, and which protruding section has a concave or forward slanted forward facing surface area.

BACKGROUND OF THE INVENTION

Armies around the world have weapons that are capable of destroying approaching missiles. The current invention provides a missile with a missile attachment, which missile attachment is such that it can force the missile to travel in a continuous spiralling motion while travelling to a target.

By travelling in a spiralling motion the missile would be harder to destroy by counter missile weapons such as radar controlled machine guns.

SUMMARY OF THE INVENTION

The missile attachment consists of a tube with a protruding section protruding sideways from the tube. The tube is fitted to the missile such that it encircles part of the missile and such that the tube can rotate continuously around the encircled part of the missile.

The protruding section protruding from the tube has a forward facing surface area. The forward facing surface area is shaped so that during forward flight-of the missile the impact of air on the forward facing surface area would result in lateral forces being exerted against the missile by means of the tube as the tube rotates around the encircled part of the missile.

In one form of the invention the missile is fitted with an electric motor such that the electric motor can rotate the tube that forms part of the missile attachment relative to the missile.

In another form of the invention a lever is pivotly attached to the missile such that when pivoted the lever can apply friction to the tube.

In another form of the invention where a lever is pivotly attached to the missile, an electric motor is attached to the missile to move the lever.

BRIEF DESCRIPTION OF THE DRAWINGS

Embodiments of the invention will now be described by way of example with reference to the accompanying drawings, of which.

DETAILED DESCRIPTION OF THE INVENTION

Figure 1:
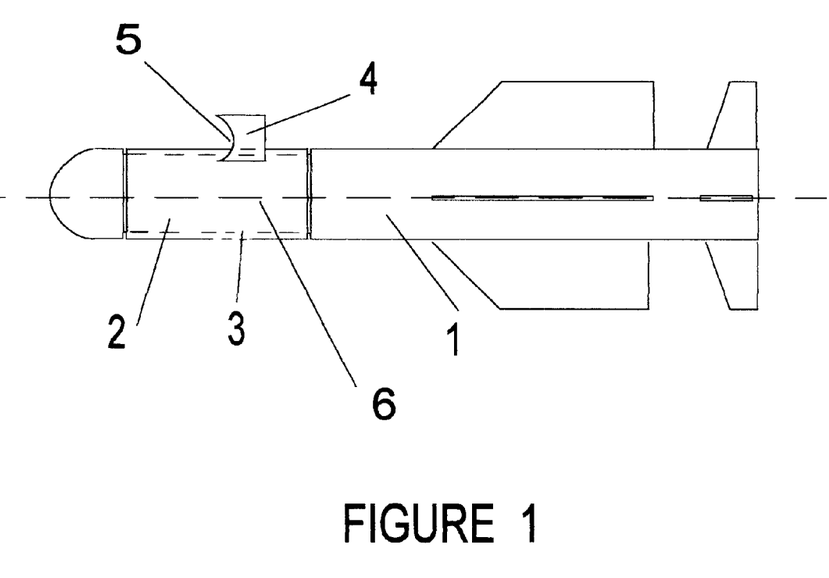
FIG. 1 shows the side of a missile with a tube encircling part of the missile, and a protruding section with a concave forward facing surface area protruding upward from the tube.

FIG. 1 shows a side view of one form of a missile 1 with a missile attachment 2 according to this invention. The missile attachment 2 consists of a tube 3 with a protruding section 4. The protruding section 4 has a concave forward facing surface area 5. The tube 3 is in the form of a cylindrical tube and has a longitudinal axis of rotation 6 and is fitted to the missile 1 so that it encircles part of the missile and such that it can rotate continuously relative to the missile 1 during flight of the missile. The cylindrical tube is shown encircling part of the missile that is narrower than the rest of the missile. As such the cylindrical tube is prevented from moving forward or rearward along the missile during flight of the missile by parts of the missile that are not as narrow as the part encircled by the cylindrical tube.

Figure 2:
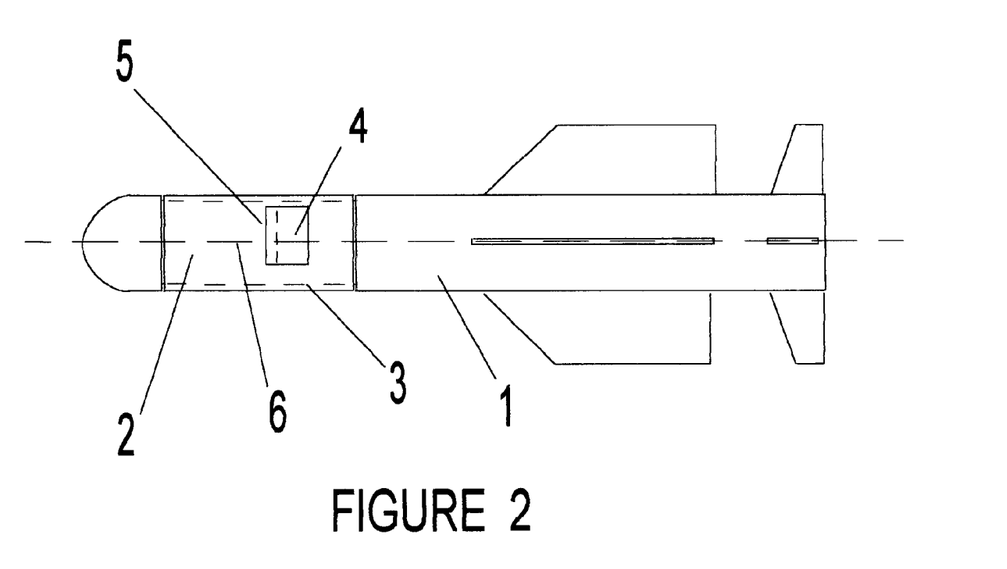
FIG. 2 shows the missile of FIG. 1 as viewed from above.

FIG. 2 shows the missile 1 of FIG. 1 as viewed from above. The protruding section 4 is shown to be rectangle shaped and is larger on the right side of the longitudinal axis 6 than on the left side of the longitudinal axis. The forward facing surface area 5 is larger on the right side. By being larger on the right side of the longitudinal axis 6, the forward facing surface area 5 would cause the cylindrical tube 3 to rotate relative to the missile during forward flight of the missile. The concave shape of the forward facing surface area 5 would produce a lateral pulling force on the cylindrical tube 3 during forward flight of the missile, thereby dragging the missile 1 sideways. The concave forward facing surface area 5 faces a direction that the missile 1 would travel in when launched if the missile was not affected by the missile attachment 2.

Figure 3:
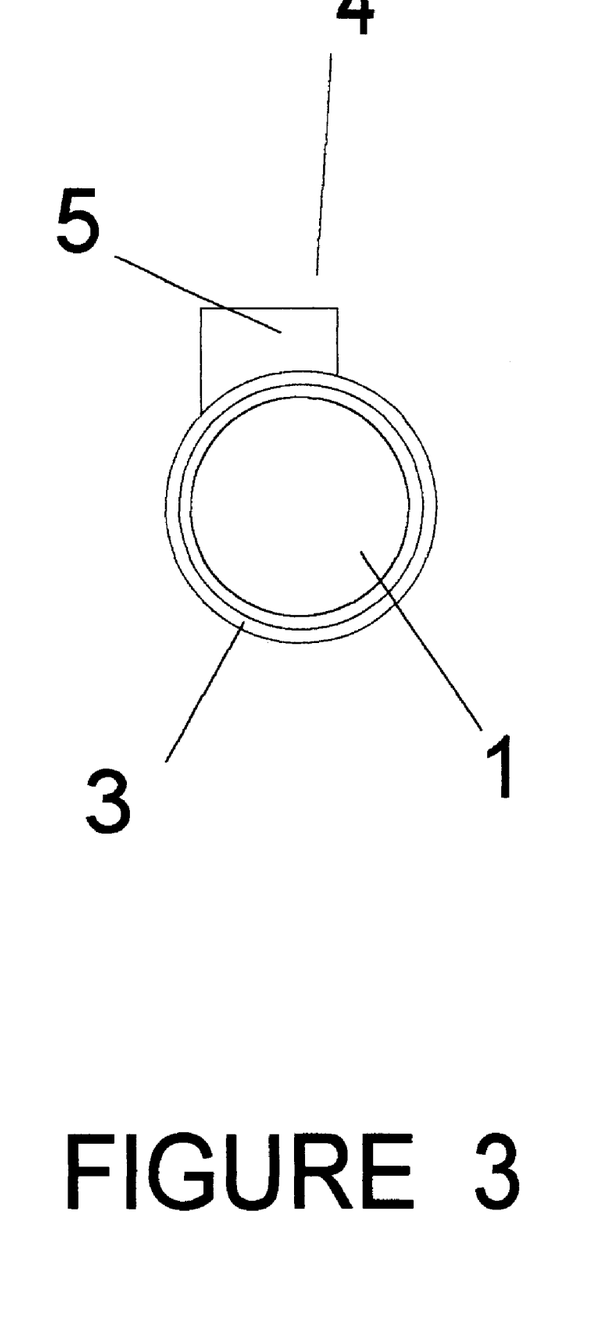
FIG. 3 shows a cross-section of the front of the missile of FIG. 1, as viewed from the front.

FIG. 3 shows a cross-section of the missile 1 and cylindrical tube 3 of FIG. 2 as viewed from the front. The concave forward facing surface area 5 of the protruding section 4 is shown as it would appear when viewed from the front.

Figure 4:
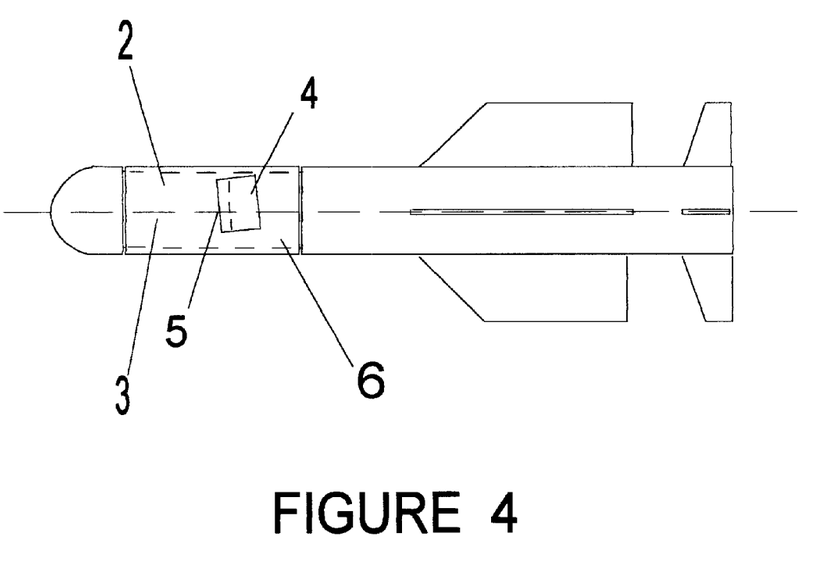
FIG. 4 shows the protruding section of the missile of FIG. 1 as viewed from above, with a protruding section that has been turned relative to the longitudinal axis of the tube.

FIG. 4 shows the protruding section 4 of FIG. 1 as viewed from above. The protruding section 4 is now shown as being rotated anti-clockwise relative to the longitudinal axis of rotation 6 of the tube 3. By being turned anit-clockwise, the concave forward facing surface area 5 would exert a greater rotational force on the cylindrical tube than when the concave forward facing surface area is not rotated in the manner shown. In FIG. 4 the concave forward facing surface area is facing a direction of travel that has as a component a direction of travel that the missile 1 would travel in when launched if the missile was not affected by missile attachment 2.

Figure 5:
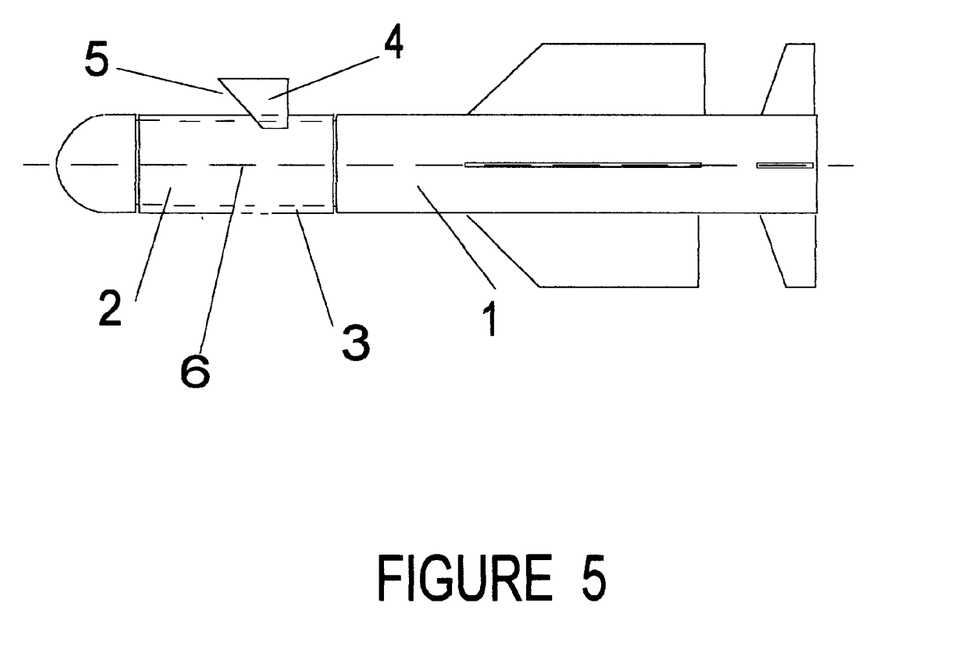
FIG. 5 shows the missile of FIG. 1, a tube encircling the missile, and a protruding section with a forward slanted forward facing surface area.

FIG. 5 shows the missile 1 of FIG. 1 with a missile attachment 2, and a protruding section 4 protruding from a cylindrical tube 3. The protruding section 4 has a flat forward facing surface area 5 that is slanted forward. The cylindrical tube rotates around the part of the missile encircled by the cylindrical tube such that the cylindrical tube has a longitudinal axis of rotation 6.

Figure 6:
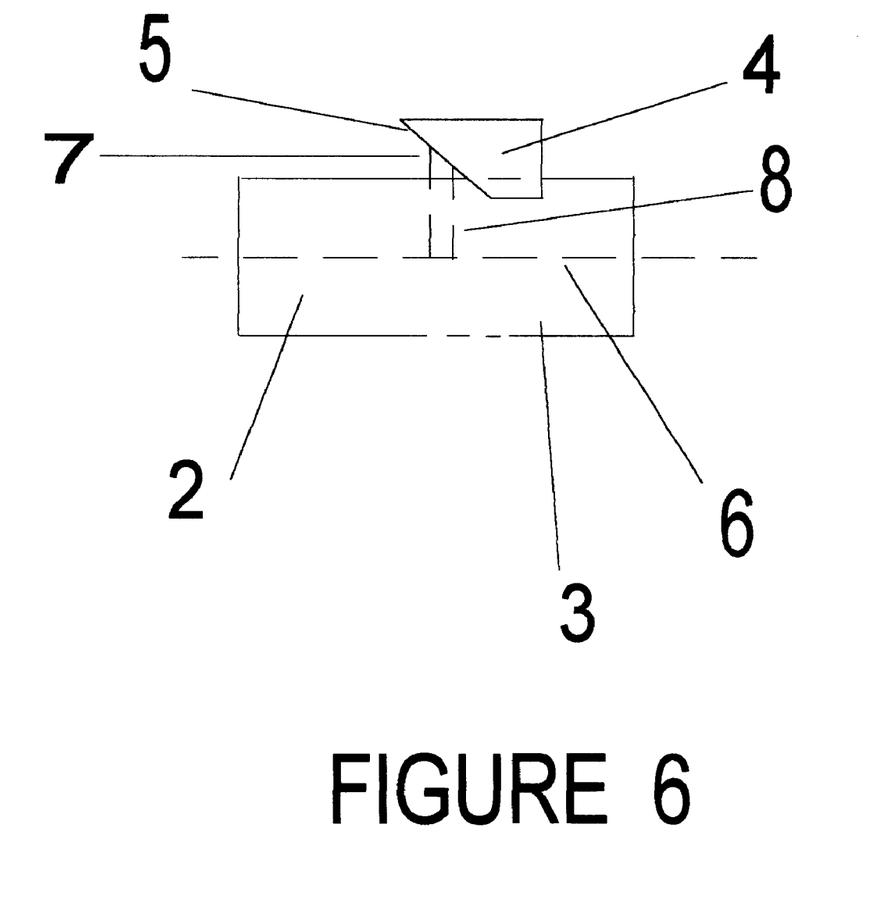
FIG. 6 shows an enlarged view of the protruding section of FIG. 5 and emphasizes the peculiar nature of the forward slant of the forward facing surface area.

FIG. 6 shows the missile attachment 2, the cylindrical tube 3 and the protruding section 4 of FIG. 5. FIG. 6 emphasizes the peculiar nature of the forward slant of the forward facing surface area 5. The forward facing surface area 5 can be seen to be laterally extending from the cylindrical tube 3 while leaning in a forward direction. The parallel lines 7 and 8 are shown extending radially from the longitudinal axis 6. Both parallel lines 7 and 8 are shown making contact with the forward slanted forward facing surface area 5 while being drawn through an area in front of the forward facing surface area. But because of the forward slant, the parallel lines are not equal in length. Viewed from above, the missile attachment 2 of FIG. 5 would appear as the missile attachment 2 of FIG. 2, with the forward facing surface area 5 facing a direction of travel which is a direction of travel that the missile would travel in when launched if the missile 1 of FIG. 5 was not affected by the missile attachment of FIG. 5.

The missile attachment 2 of FIG. 5 viewed from above would appear as the missile attachment 2 of FIG. 4 if the protruding section 4 was turned slightly anti-clockwise on the cylindrical tube 3, such that the forward facing surface area 5 of FIG. 5 would then be facing a direction of travel which is a direction of travel that has as a component the direction of travel that the missile would travel in when launched if the missile was not affected by the missile attachment.

Figure 7:
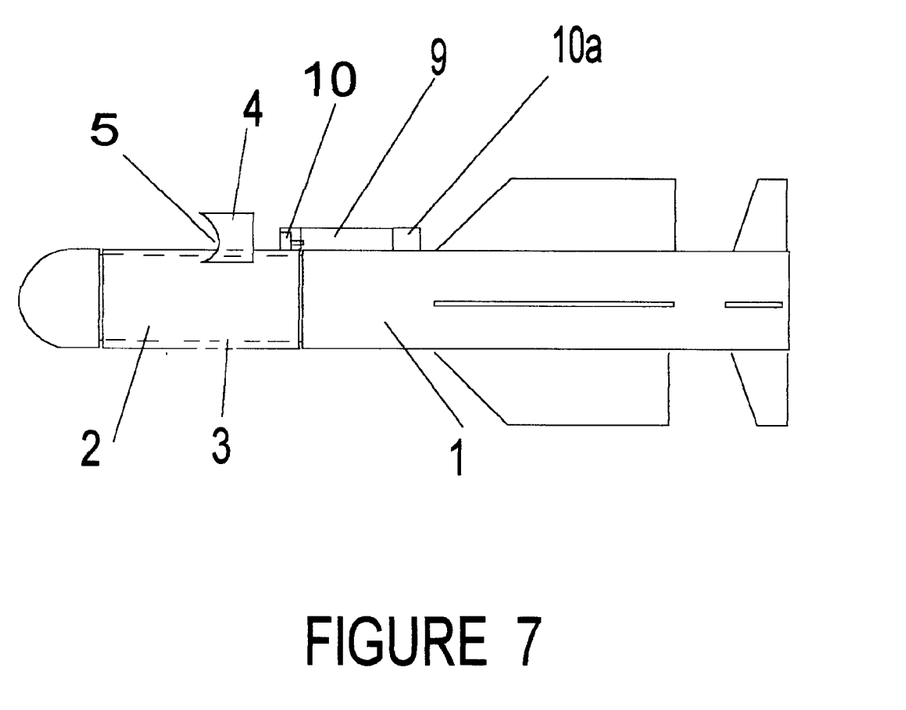
FIG. 7 shows the missile of FIG. 1 and a protruding section with a concave forward facing surface area protruding from a tube, and an electric motor attached to the missile which can rotate the tube relative to the missile.

FIG. 7 shows the missile 1 of FIG. 1, with a missile attachment 2 consisting of the cylindrical tube 3 and a protruding section 4 with a concave forward facing surface area 5. Shown also in FIG. 7 is an electric motor 9 which is connected to the missile such that it overlaps the cylindrical tube and makes contact with the cyindrical tube by means of a solid wheel 10 which is rotated by the electric motor 9. A battery 10a provides electrical power for the electric motor 9. The electric motor 9 is able to rotate the cylindrical tube relative to the missile and provides the ability to control the rotation of the cylindrical tube relative to the missile.

Figure 8:
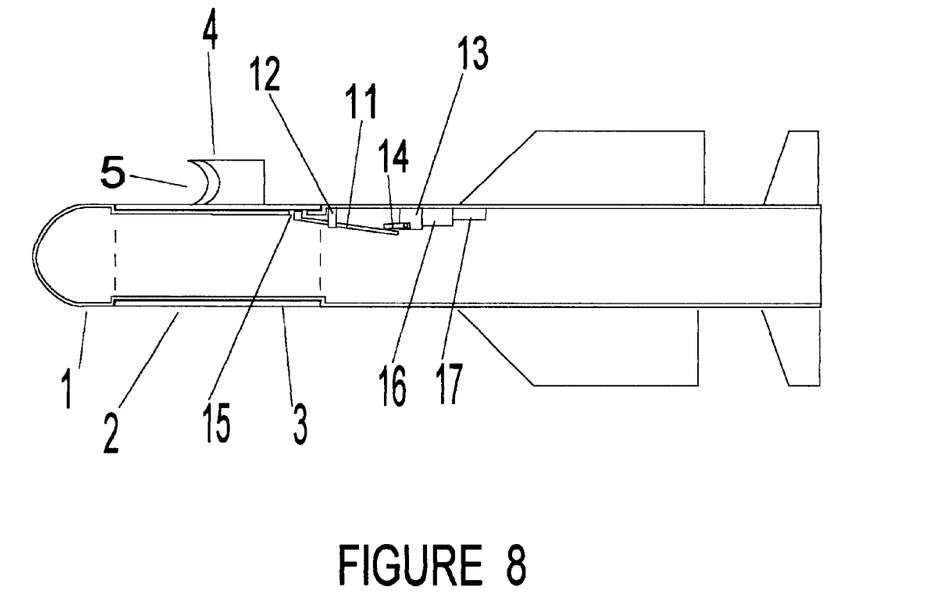
FIG. 8 shows another form of the missile of FIG. 1 and a protruding section with a concave forward facing surface area protruding from a tube, and a lever connected to the missile which can forcefully be pressed against the tube by means of an electric motor.

FIG. 8 shows another form of the missile 1 with a missile attachment 2. The missile attachment consists of a cylindrical tube 3 which encircles part of the missile 1, and a protruding section 4 with a concave forward facing surface area 5. Shown also is a lever 11 pivotly attached to the missile by a bracket 12, such that the lever 11 can be pivoted by an electric motor 13 using a rotor arm 14. When the lever is pivoted by the electric motor 13, using the rotor arm 14, a part of the lever is pressed through a hole 15 in the missile 1 so that the part of the lever that is pressed through the hole can reach the cylindrical tube. As the rotor arm 14 presses harder against the lever, the lever is pressed harder against the cylindrical tube. With the friction that occurs between the lever and the cylindrical tube, the rotation of the cylindrical tube relative to the missile can be controlled, so that the spiralling motion of the missile can be controlled. A computer 16 controls the operation of the electric motor 13 and a battery 17 provides power for the computer 16 and the electric motor 13.

The claims defining this invention are as follows:

1. A missile with a missile attachment which said missile attachment consists of a tube with a protruding section, which said protruding section protrudes outward from the tube, and which said protruding section has a concave forward facing surface area, with the said tube attached to the missile such that a part of the missile is encircled by the said tube and such that the said tube is able to rotate relative to the part of the missile that is encircled by the tube, with the tube having a longitudinal axis of rotation, and which concave forward facing surface area is curved such that if the tube was placed in a horizontal position such that the longitudinal axis of rotation of the tube was placed in a horizontal position, and a side of the tube could be viewed while the tube was in the said horizontal position, and the protruding section was positioned on an upper most position on the tube such that the protruding section protruded above the tube, an outline of the concave forward facing surface area that protruded above the tube would appear concave with respect to the protruding section while a side of the tube is viewed from a position that is level in height to the longitudinal axis of rotation of the tube.

2. The missile of claim 1 wherein with the missile and the tube in a horizontal position such that the longitudinal axis of rotation of the tube in a horizontal position and the protruding section protruding from the tube in an upper most position on the tube, the said concave forward facing surface area faces a direction, which direction has as a component a direction of travel that the missile would travel in when the missile is launched, if the missile was not affected by the said missile attachment, which said direction of travel is a forward direction of travel.

3. The missile of claim 2 wherein an electric motor is attached to the missile, which said electric motor is attached to the missile such that the electric motor can rotate the said tube such that the tube can be rotated in a controlled manner relative to the encircled part of the missile.

4. The missile of claim 2 wherein a lever is attached to the missile such that a part of the lever can be pushed towards the said tube so as to induce frictional force between the said lever and the tube.

5. The missile of claim 4 wherein an electric motor is used to move the said lever such that a part of the lever can be pushed towards the said tube such that frictional force between the said lever and the tube can be induced.

6. The missile of claim 1 wherein with the missile and the tube in a horizontal position such that the longitudinal axis of rotation of the tube is in a horizontal position and the protruding section protruding from the tube is in an upper most position on the tube, the said concave forward facing surface area faces a direction, which direction is a direction of travel that the missile would travel in when the missile is launched, if the missile was not affected by the said missile attachment, which said direction of travel is a forward direction of travel.

7. The missile of claim 6 wherein an electric motor is attached to the missile, which said electric motor is attached to the missile such that the electric motor can rotate the said tube such that the tube can be rotated in a controlled manner relative to the encircled part of the missile.

8. The missile of claim 6 wherein a lever is attached to the missile such that a part of the lever can be pushed towards the said tube so as to induce frictional force between the said lever and the tube.

9. The missile of claim 8 wherein an electric motor is used to move the said lever such that a part of the lever can be pushed towards the said tube such that frictional force between the said lever and the tube can be induced.

10. The missile of claim 1 wherein an electric motor is attached to the missile, which said electric motor is attached to the missile such that the electric motor can rotate the said tube such that the tube can be rotated in a controlled manner relative to the encircled part of the missile.

11. The missile of claim 1 wherein a lever is attached to the missile such that a part of the lever can be pushed towards the said tube so as to induce frictional force between the said lever and the tube.

12. The missile of claim 11 wherein an electric motor is used to move the said lever such that a part of the lever can be pushed towards the said tube such that frictional force between the said lever and the tube can be induced.

13. The missile of claim 1 wherein the said tube is in the form of a cylindrical tube.

14. A missile with a missile attachment which said missile attachment consists of a tube with a protruding section, which said protruding section protrudes outward from the tube, and which said protruding section has a forward facing surface area, with the said tube attached to the missile such that a part of the missile is encircled by the said tube and such that the said tube can be rotated continuously in one direction relative to the part of the missile that is encircled by the tube, with the protruding section able to complete numerous revolutions relative to the missile while revolving around the missile during continuous rotation of the tube around the encircled part of the missile, with the tube having a longitudinal axis of rotation and which said forward facing surface area is slanted forward such that the said forward facing surface area extends laterally away from the tube and such that as the forward facing surface area extends laterally away from the tube the forward facing surface area leans in a forward direction, and which said forward facing surface area is thus slanted forward relative to the longitudinal axis of rotation of the cylindrical tube, and such that if a plurality of lines are drawn radially away from the longitudinal axis of the tube, with each line drawn from a different point on the longitudinal axis to that of another line, and with the lines drawn from points on the longitudinal axis such that the lines could reach the forward facing surface area while drawn through an area in front of the forward facing surface area and while the lines are drawn parallel to one another, with the lines being of such respective lengths that the lines could make contact with the forward facing surface area while remaining parallel, but not be extended beyond the point of contact with the forward facing surface area, then one of the said lines would be shorter in length with respect to another of the said lines.

15. The missile of claim 14 wherein with the missile and the tube in a horizontal position such that the longitudinal axis of rotation of the tube is in a horizontal position and the protruding section protruding from the tube is in an upper most position on the tube, the said forward facing surface area faces a direction, which direction has as a component a direction of travel that the missile would travel in when the missile is launched, if the missile was not affected by the said missile attachment, which said direction of travel is a forward direction of travel.

16. The missile of claim 15 wherein an electric motor is attached to the missile, which said electric motor is attached to the missile such that the electric motor can rotate the said tube such that the tube can be rotated in a controlled manner relative to the encircled part of the missile.

17. The missile of claim 15 wherein a lever is attached to the missile such that a part of the lever can be pushed towards the said tube so as to induce frictional force between the said lever and the tube.

18. The missile of claim 17 wherein an electric motor is used to move the said lever such that a part of the lever can be pushed towards the said tube such that frictional force between the said lever and the tube can be induced.

19. The missile of claim 14 wherein with the missile and the tube in a horizontal position such that the longitudinal axis of rotation of the tube is in a horizontal position and the protruding section protruding from the tube is in an upper most position on the tube, the said forward facing surface area faces a direction, which direction is a direction of travel that the missile would travel in when the missile is launched, if the missile was not affected by the said missile attachment, which said direction of travel is a forward direction of travel.

20. The missile of claim 19 wherein an electric motor is attached to the missile, which said electric motor is attached to the missile such that the electric motor can rotate the said tube such that the tube can be rotated in a controlled manner relative to the encircled part of the missile.

21. The missile of claim 19 wherein a lever is attached to the missile such that a part of the lever can be pushed towards the said tube so as to induce frictional force between the said lever and the tube.

22. The missile of claim 21 wherein an electric motor is used to move the said lever such that a part of the lever can be pushed towards the said tube such that frictional force between the said lever and the tube can be induced.

23. The missile of claim 14 wherein an electric motor is attached to the missile, which said electric motor is attached to the missile such that the electric motor can rotate the said tube such that the tube can be rotated in a controlled manner relative to the encircled part of the missile.

24. The missile of claim 14 wherein a lever is attached to the missile such that a part of the lever can be pushed towards the said tube so as to induce frictional force between the said lever and the tube.

25. The missile of claim 24 wherein an electric motor is used to move the said lever such that a part of the lever can be pushed towards the said tube such that frictional force between the said lever and the tube can be induced.

26. The missile of claim 14 wherein the said tube is in the form of a cylindrical tube.

27. A missile with a missile attachment which said missile attachment consists of a tube with a protruding section, which said protruding section protrudes outward from the tube, and which said protruding section has a concave forward facing surface area, with the said tube attached to the missile such that a part of the missile is encircled by the said tube and such that the said tube is able to rotate relative to the part of the missile that is encircled by the tube, such that the said tube can be rotated continuously relative to the part of the missile that is encircled by the tube, with the protruding section able to complete numerous revolutions around the missile during flight through the continuous rotation of the tube around the encircled part of the missile, with the tube having a longitudinal axis of rotation, and which concave forward facing surface area is curved such that if the tube was placed in a horizontal position such that the longitudinal axis of rotation of the tube was placed in a horizontal position, and a side of the tube could be viewed while the tube was in the said horizontal position, and the protruding section was positioned on an upper most position on the tube such that the protruding section protruded above the tube, an outline of the concave forward facing surface area that protruded above the tube would appear concave with respect to the protruding section while a side of the tube is viewed from a position that is level in height to the longitudinal axis of rotation of the tube.

* * * * *